(12) United States Patent
Mullen et al.

(10) Patent No.: US 8,322,623 B1
(45) Date of Patent: Dec. 4, 2012

(54) SYSTEMS AND METHODS FOR ADVANCED CARD PRINTING

(75) Inventors: Jeffrey D. Mullen, Pittsburgh, PA (US); Eric R. Nicklaus, Pittsburgh, PA (US)

(73) Assignee: Dynamics Inc., Pittsburgh, PA (US)

( * ) Notice: Subject to any disclaimer, the term of this patent is extended or adjusted under 35 U.S.C. 154(b) by 0 days.

(21) Appl. No.: 13/191,298

(22) Filed: Jul. 26, 2011

Related U.S. Application Data

(60) Provisional application No. 61/367,598, filed on Jul. 26, 2010.

(51) Int. Cl.
*G06K 19/02* (2006.01)
(52) U.S. Cl. .................................... 235/488
(58) Field of Classification Search .................. 235/488; 264/308; 700/118–120
See application file for complete search history.

(56) References Cited

U.S. PATENT DOCUMENTS

| | | |
|---|---|---|
| 4,353,064 A | 10/1982 | Stamm |
| 4,394,654 A | 7/1983 | Hofmann-Cerfontaine |
| 4,614,861 A | 9/1986 | Pavlov et al. |
| 4,667,087 A | 5/1987 | Quintana |
| 4,701,601 A | 10/1987 | Francini et al. |
| 4,720,860 A | 1/1988 | Weiss |
| 4,786,791 A | 11/1988 | Hodama |
| 4,791,283 A | 12/1988 | Burkhardt |
| 4,797,542 A | 1/1989 | Hara |
| 5,038,251 A | 8/1991 | Sugiyama et al. |
| 5,168,520 A | 12/1992 | Weiss |
| 5,237,614 A | 8/1993 | Weiss |
| 5,276,311 A | 1/1994 | Hennige |
| 5,347,580 A | 9/1994 | Molva et al. |
| 5,361,062 A | 11/1994 | Weiss et al. |
| 5,412,199 A | 5/1995 | Finkelstein et al. |
| 5,434,398 A | 7/1995 | Goldberg |
| 5,434,405 A | 7/1995 | Finkelstein et al. |
| 5,478,994 A | 12/1995 | Rahman |
| 5,479,512 A | 12/1995 | Weiss |
| 5,484,997 A | 1/1996 | Haynes |
| 5,485,519 A | 1/1996 | Weiss |
| 5,585,787 A | 12/1996 | Wallerstein |
| 5,591,949 A | 1/1997 | Bernstein |

(Continued)

FOREIGN PATENT DOCUMENTS

JP 05210770 A 8/1993

(Continued)

OTHER PUBLICATIONS

U.S. Appl. No. 60/594,300, filed Mar. 26, 2005, Poidomani et al.

(Continued)

*Primary Examiner* — Thien M Le
*Assistant Examiner* — Toan Ly

(57) ABSTRACT

Layers of colored polymers are applied to a surface of a card and are hardened and adhered to a card via light such as ultraviolet or light having a wavelength in the blue spectrum. The layers may be applied to form three dimensional indicia on the surface of the card. For example, letters, numbers, logos, and other indicia (e.g., pictures) may be printed three dimensionally onto the surface of the card. Troughs may be formed via such layering such that indicia is provided as indentations into the added layers. Extensions may be formed via such layering such that indicia is provided as extensions from the added layers. Indicia may be provided via extensions and/or indentations. As such, embossed and/or engraved indicia may be provided on the surface of a card without impacting the structural integrity of the card.

18 Claims, 9 Drawing Sheets

U.S. PATENT DOCUMENTS

| | | | |
|---|---|---|---|
| 5,608,203 A | 3/1997 | Finkelstein et al. | |
| 5,623,552 A | 4/1997 | Lane | |
| 5,657,388 A | 8/1997 | Weiss | |
| 5,834,747 A | 11/1998 | Cooper | |
| 5,834,756 A | 11/1998 | Gutman et al. | |
| 5,856,661 A | 1/1999 | Finkelstein et al. | |
| 5,864,623 A | 1/1999 | Messina et al. | |
| 5,907,142 A | 5/1999 | Kelsey | |
| 5,913,203 A | 6/1999 | Wong et al. | |
| 5,937,394 A | 8/1999 | Wong et al. | |
| 5,955,021 A | 9/1999 | Tiffany, III | |
| 5,956,699 A | 9/1999 | Wong et al. | |
| 5,969,318 A * | 10/1999 | Mackenthun | 235/380 |
| 6,025,054 A | 2/2000 | Tiffany, III | |
| 6,045,043 A | 4/2000 | Bashan et al. | |
| 6,064,988 A * | 5/2000 | Thomas | 705/44 |
| 6,076,163 A | 6/2000 | Hoffstein et al. | |
| 6,085,320 A | 7/2000 | Kaliski | |
| 6,095,416 A | 8/2000 | Grant et al. | |
| 6,130,621 A | 10/2000 | Weiss | |
| 6,145,079 A | 11/2000 | Mitty et al. | |
| 6,157,920 A | 12/2000 | Jakobsson et al. | |
| 6,161,181 A | 12/2000 | Haynes, III et al. | |
| 6,176,430 B1 | 1/2001 | Finkelstein et al. | |
| 6,182,894 B1 | 2/2001 | Hackett et al. | |
| 6,189,098 B1 | 2/2001 | Kaliski | |
| 6,199,052 B1 | 3/2001 | Mitty et al. | |
| 6,206,293 B1 | 3/2001 | Gutman et al. | |
| 6,240,184 B1 | 5/2001 | Huynh et al. | |
| 6,241,153 B1 | 6/2001 | Tiffany, III | |
| 6,256,873 B1 | 7/2001 | Tiffany, III | |
| 6,269,163 B1 | 7/2001 | Rivest et al. | |
| 6,286,022 B1 | 9/2001 | Kaliski et al. | |
| 6,308,890 B1 | 10/2001 | Cooper | |
| 6,313,724 B1 | 11/2001 | Osterweil | |
| 6,389,442 B1 | 5/2002 | Yin et al. | |
| 6,393,447 B1 | 5/2002 | Jakobsson et al. | |
| 6,411,715 B1 | 6/2002 | Liskov et al. | |
| 6,446,052 B1 | 9/2002 | Juels | |
| 6,460,141 B1 | 10/2002 | Olden | |
| 6,592,044 B1 | 7/2003 | Wong et al. | |
| 6,607,127 B2 | 8/2003 | Wong | |
| 6,609,654 B1 | 8/2003 | Anderson et al. | |
| 6,631,849 B2 | 10/2003 | Blossom | |
| 6,655,585 B2 | 12/2003 | Shinn | |
| 6,681,988 B2 | 1/2004 | Stack et al. | |
| 6,705,520 B1 | 3/2004 | Pitroda et al. | |
| 6,755,341 B1 | 6/2004 | Wong et al. | |
| 6,764,005 B2 | 7/2004 | Cooper | |
| 6,769,618 B1 | 8/2004 | Finkelstein | |
| 6,805,288 B2 | 10/2004 | Routhenstein et al. | |
| 6,811,082 B2 | 11/2004 | Wong | |
| 6,813,354 B1 | 11/2004 | Jakobsson et al. | |
| 6,817,532 B2 | 11/2004 | Finkelstein | |
| 6,873,974 B1 | 3/2005 | Schutzer | |
| 6,902,116 B2 | 6/2005 | Finkelstein | |
| 6,970,070 B2 | 11/2005 | Juels et al. | |
| 6,980,969 B1 | 12/2005 | Tuchler et al. | |
| 6,985,583 B1 | 1/2006 | Brainard et al. | |
| 6,991,155 B2 | 1/2006 | Burchette, Jr. | |
| 7,013,030 B2 | 3/2006 | Wong et al. | |
| 7,035,443 B2 | 4/2006 | Wong | |
| 7,039,223 B2 | 5/2006 | Wong | |
| 7,044,394 B2 | 5/2006 | Brown | |
| 7,051,929 B2 | 5/2006 | Li | |
| 7,083,094 B2 | 8/2006 | Cooper | |
| 7,100,049 B2 | 8/2006 | Gasparini et al. | |
| 7,100,821 B2 | 9/2006 | Rasti | |
| 7,111,172 B1 | 9/2006 | Duane et al. | |
| 7,114,652 B2 | 10/2006 | Moullette et al. | |
| 7,136,514 B1 | 11/2006 | Wong | |
| 7,140,550 B2 | 11/2006 | Ramachandran | |
| 7,163,153 B2 | 1/2007 | Blossom | |
| 7,195,154 B2 | 3/2007 | Routhenstein | |
| 7,197,639 B1 | 3/2007 | Juels et al. | |
| 7,219,368 B2 | 5/2007 | Juels et al. | |
| 7,225,537 B2 | 6/2007 | Reed | |
| 7,225,994 B2 | 6/2007 | Finkelstein | |
| 7,246,752 B2 | 7/2007 | Brown | |
| 7,298,243 B2 | 11/2007 | Juels et al. | |
| 7,334,732 B2 | 2/2008 | Cooper | |
| 7,337,326 B2 | 2/2008 | Palmer et al. | |
| 7,346,775 B2 | 3/2008 | Gasparini et al. | |
| 7,356,696 B1 | 4/2008 | Jakobsson et al. | |
| 7,357,319 B1 | 4/2008 | Lin et al. | |
| 7,359,507 B2 | 4/2008 | Kaliski | |
| 7,360,688 B1 | 4/2008 | Harris | |
| 7,363,494 B2 | 4/2008 | Brainard et al. | |
| 7,380,710 B2 | 6/2008 | Brown | |
| 7,398,253 B1 | 7/2008 | Pinnell | |
| 7,404,087 B2 | 7/2008 | Teunen | |
| 7,424,570 B2 | 9/2008 | D'Albore et al. | |
| 7,427,033 B1 | 9/2008 | Roskind | |
| 7,454,349 B2 | 11/2008 | Teunen et al. | |
| 7,461,250 B1 | 12/2008 | Duane et al. | |
| 7,461,399 B2 | 12/2008 | Juels et al. | |
| 7,472,093 B2 | 12/2008 | Juels | |
| 7,472,829 B2 | 1/2009 | Brown | |
| 7,494,055 B2 | 2/2009 | Fernandes et al. | |
| 7,502,467 B2 | 3/2009 | Brainard et al. | |
| 7,502,933 B2 | 3/2009 | Jakobsson et al. | |
| 7,503,485 B1 | 3/2009 | Routhenstein | |
| 7,516,492 B1 | 4/2009 | Nisbet et al. | |
| 7,523,301 B2 | 4/2009 | Nisbet et al. | |
| 7,530,495 B2 | 5/2009 | Cooper | |
| 7,532,104 B2 | 5/2009 | Juels | |
| 7,543,739 B2 | 6/2009 | Brown et al. | |
| 7,559,464 B2 | 7/2009 | Routhenstein | |
| 7,562,221 B2 | 7/2009 | Nystrom et al. | |
| 7,562,222 B2 | 7/2009 | Gasparini et al. | |
| 7,580,898 B2 | 8/2009 | Brown et al. | |
| 7,584,153 B2 | 9/2009 | Brown et al. | |
| 7,591,426 B2 | 9/2009 | Osterweil et al. | |
| 7,591,427 B2 | 9/2009 | Osterweil | |
| 7,602,904 B2 | 10/2009 | Juels et al. | |
| 7,631,804 B2 | 12/2009 | Brown | |
| 7,639,537 B2 | 12/2009 | Sepe et al. | |
| 7,641,124 B2 | 1/2010 | Brown et al. | |
| 7,660,902 B2 | 2/2010 | Graham et al. | |
| 7,828,207 B2 | 11/2010 | Cooper | |
| 2001/0034702 A1 | 10/2001 | Mockett et al. | |
| 2001/0047335 A1 | 11/2001 | Arndt et al. | |
| 2002/0059114 A1 | 5/2002 | Cockrill et al. | |
| 2002/0082989 A1 | 6/2002 | Fife et al. | |
| 2002/0096570 A1 | 7/2002 | Wong et al. | |
| 2002/0120583 A1 | 8/2002 | Keresman, III et al. | |
| 2003/0034388 A1 | 2/2003 | Routhenstein et al. | |
| 2003/0052168 A1 | 3/2003 | Wong | |
| 2003/0057278 A1 | 3/2003 | Wong | |
| 2003/0116635 A1 | 6/2003 | Taban | |
| 2003/0152253 A1 | 8/2003 | Wong | |
| 2003/0163287 A1 | 8/2003 | Vock et al. | |
| 2003/0173409 A1 | 9/2003 | Vogt et al. | |
| 2003/0179909 A1 | 9/2003 | Wong et al. | |
| 2003/0179910 A1 | 9/2003 | Wong | |
| 2003/0226899 A1 | 12/2003 | Finkelstein | |
| 2004/0035942 A1 | 2/2004 | Silverman | |
| 2004/0133787 A1 | 7/2004 | Doughty | |
| 2004/0162732 A1 | 8/2004 | Rahim et al. | |
| 2004/0172535 A1 | 9/2004 | Jakobsson | |
| 2004/0177045 A1 | 9/2004 | Brown | |
| 2004/0183796 A1* | 9/2004 | Velde et al. | 345/419 |
| 2005/0043997 A1 | 2/2005 | Sahota et al. | |
| 2005/0080747 A1 | 4/2005 | Anderson et al. | |
| 2005/0086160 A1 | 4/2005 | Wong et al. | |
| 2005/0086177 A1 | 4/2005 | Anderson et al. | |
| 2005/0116026 A1 | 6/2005 | Burger et al. | |
| 2005/0119940 A1 | 6/2005 | Concilio et al. | |
| 2005/0154643 A1 | 7/2005 | Doan et al. | |
| 2005/0228959 A1 | 10/2005 | D'Albore et al. | |
| 2006/0000900 A1 | 1/2006 | Fernandes et al. | |
| 2006/0037073 A1 | 2/2006 | Juels et al. | |
| 2006/0041759 A1 | 2/2006 | Kaliski et al. | |
| 2006/0085328 A1 | 4/2006 | Cohen et al. | |
| 2006/0091223 A1 | 5/2006 | Zellner | |
| 2006/0161435 A1 | 7/2006 | Atef et al. | |
| 2006/0163353 A1 | 7/2006 | Moulette et al. | |

| | | | |
|---|---|---|---|
| 2006/0174104 A1 | 8/2006 | Crichton et al. | |
| 2006/0196931 A1 | 9/2006 | Holtmanns et al. | |
| 2006/0227523 A1* | 10/2006 | Pennaz et al. | 361/783 |
| 2006/0256961 A1 | 11/2006 | Brainard et al. | |
| 2007/0034700 A1 | 2/2007 | Poidomani et al. | |
| 2007/0114274 A1 | 5/2007 | Gibbs et al. | |
| 2007/0124321 A1 | 5/2007 | Szydlo | |
| 2007/0152070 A1 | 7/2007 | D'Albore | |
| 2007/0152072 A1 | 7/2007 | Frallicciardi et al. | |
| 2007/0153487 A1 | 7/2007 | Frallicciardi et al. | |
| 2007/0174614 A1 | 7/2007 | Duane et al. | |
| 2007/0192249 A1 | 8/2007 | Biffle et al. | |
| 2007/0241183 A1 | 10/2007 | Brown et al. | |
| 2007/0241201 A1 | 10/2007 | Brown et al. | |
| 2007/0256123 A1 | 11/2007 | Duane et al. | |
| 2007/0291753 A1 | 12/2007 | Romano | |
| 2008/0005510 A1 | 1/2008 | Sepe et al. | |
| 2008/0008315 A1 | 1/2008 | Fontana et al. | |
| 2008/0008322 A1 | 1/2008 | Fontana et al. | |
| 2008/0010675 A1 | 1/2008 | Massascusa et al. | |
| 2008/0016351 A1 | 1/2008 | Fontana et al. | |
| 2008/0019507 A1 | 1/2008 | Fontana et al. | |
| 2008/0028447 A1 | 1/2008 | O'Malley et al. | |
| 2008/0040271 A1 | 2/2008 | Hammad et al. | |
| 2008/0040276 A1 | 2/2008 | Hammad et al. | |
| 2008/0058016 A1 | 3/2008 | Di Maggio et al. | |
| 2008/0059379 A1 | 3/2008 | Ramaci et al. | |
| 2008/0096326 A1 | 4/2008 | Reed | |
| 2008/0126398 A1 | 5/2008 | Cimino | |
| 2008/0128515 A1 | 6/2008 | Di Iorio | |
| 2008/0148394 A1 | 6/2008 | Poidomani et al. | |
| 2008/0201264 A1 | 8/2008 | Brown et al. | |
| 2008/0209550 A1 | 8/2008 | Di Iorio | |
| 2008/0288699 A1 | 11/2008 | Chichierchia | |
| 2008/0294930 A1 | 11/2008 | Varone et al. | |
| 2008/0302877 A1 | 12/2008 | Musella et al. | |
| 2009/0013122 A1 | 1/2009 | Sepe et al. | |
| 2009/0036147 A1 | 2/2009 | Romano | |
| 2009/0046522 A1 | 2/2009 | Sepe et al. | |
| 2009/0108064 A1 | 4/2009 | Fernandes et al. | |
| 2009/0150295 A1 | 6/2009 | Hatch et al. | |
| 2009/0152365 A1 | 6/2009 | Li et al. | |
| 2009/0200385 A1* | 8/2009 | Hachey et al. | 235/494 |
| 2009/0242648 A1 | 10/2009 | Di Sirio et al. | |
| 2009/0244858 A1 | 10/2009 | Di Sirio et al. | |
| 2009/0253460 A1 | 10/2009 | Varone et al. | |
| 2009/0255996 A1 | 10/2009 | Brown et al. | |
| 2009/0290704 A1 | 11/2009 | Cimino | |
| 2009/0303885 A1 | 12/2009 | Longo | |
| 2010/0065639 A1* | 3/2010 | Schutzmann et al. | 235/449 |
| 2011/0028184 A1 | 2/2011 | Cooper | |

FOREIGN PATENT DOCUMENTS

| | | |
|---|---|---|
| WO | WO9852735 | 11/1998 |
| WO | WO0247019 | 6/2002 |
| WO | WO2006066322 | 6/2006 |
| WO | WO2006080929 | 8/2006 |
| WO | WO2006105092 | 10/2006 |
| WO | WO2006116772 | 11/2006 |
| WO | WO2008064403 | 6/2008 |

OTHER PUBLICATIONS

U.S. Appl. No. 60/675,388, filed Apr. 28, 2005, Poidomani et al.
The Bank Credit Card Business. Second Edition, American Bankers Association, Washington, D.C., 1996.
A Day in the Life of a Flux Reversal. http://www.phrack.org/issues.html?issue=37&id=6#article. As viewed on Apr. 12, 2010.
Dynamic Virtual Credit Card Numbers. http://homes.cerias.purdue.edu/—jtli/paper/fc07.pdf. As viewed on Apr. 12, 2010.
English translation of JP 05210770 A.

* cited by examiner

SYSTEMS AND METHODS FOR ADVANCED CARD PRINTING

CROSS-REFERENCE TO RELATED APPLICATION

This application claims the benefit of U.S. Provisional Patent Application No. 61/367,598, titled "SYSTEMS AND METHODS FOR ADVANCED CARD PRINTING," filed Jul. 26, 2010, which is hereby incorporated by reference herein in its entirety.

BACKGROUND OF THE INVENTION

This invention relates to magnetic cards and devices and associated payment systems.

A traditional card embosser physically punches a payment card number partially through one surface of a card such that the payment card number extends from the other surface of the card. Such a traditional card embosser decreases the structural integrity of the card and, as such, reduces the durability of the card.

A traditional card engraver physically engraves a payment card number partially through one surface of a card. Such a traditional card engraver decreases the structural integrity of the card and, as such, reduces the durability of the card.

It is therefore desirable to increase the whimsical and festive nature of a card without decreasing the structural integrity of the card.

SUMMARY OF THE INVENTION

Systems and methods of card printing are provided that increase the whimsical and festive nature of a card without decreasing the structural integrity of the card. Particularly embossed and/or engraved indicia may be provided on the surface of a card without decreasing the structural integrity of the card.

A card may include a dynamic magnetic communications device. Such a dynamic magnetic communications device may take the form of a magnetic encoder or a magnetic emulator. A magnetic encoder may change the information located on a magnetic medium such that a magnetic stripe reader may read changed magnetic information from the magnetic medium. A magnetic emulator may generate electromagnetic fields that directly communicate data to a magnetic stripe reader. Such a magnetic emulator may communicate data serially to a read-head of the magnetic stripe reader.

All, or substantially all, of the front as well as the back of a card may be a display (e.g., bi-stable, non bi-stable, LCD, LED, or electrochromic display). Electrodes of a display may be coupled to one or more capacitive touch sensors such that a display may be provided as a touch-screen display. Any type of touch-screen display may be utilized. Such touch-screen displays may be operable of determining multiple points of touch. Accordingly, a barcode may be displayed across all, or substantially all, of a surface of a card. In doing so, computer vision equipment such as barcode readers may be less susceptible to errors in reading a displayed barcode.

A card may include a number of output devices to output dynamic information. For example, a card may include one or more RFIDs or IC chips to communicate to one or more RFID readers or IC chip readers, respectively. A card may include devices to receive information. For example, an RFID and IC chip may both receive information and communicate information to an RFID and IC chip reader, respectively. A device for receiving wireless information signals may be provided. A light sensing device or sound sensing device may be utilized to receive information wirelessly. A card may include a central processor that communicates data through one or more output devices simultaneously (e.g., an RFID, IC chip, and a dynamic magnetic stripe communications device). The central processor may receive information from one or more input devices simultaneously (e.g., an RFID, IC chip, dynamic magnetic stripe devices, light sensing device, and a sound sensing device). A processor may be coupled to surface contacts such that the processor may perform the processing capabilities of, for example, an EMV chip. The processor may be laminated over and not exposed such that such a processor is not exposed on the surface of the card.

A card may be provided with a button in which the activation of the button causes a code to be communicated through a dynamic magnetic stripe communications device (e.g., the subsequent time a read-head detector on the card detects a read-head). The code may be indicative of, for example, a feature (e.g., a payment feature). The code may be received by the card via manual input (e.g., onto buttons of the card) or via a wireless transmission (e.g., via light, electromagnetic communications, sound, or other wireless signals). A code may be communicated from a webpage (e.g., via light and/or sound) to a card. A card may include a display such that a received code may be visually displayed to a user. In doing so, the user may be provided with a way to select, and use, the code via both an in-store setting (e.g., via a magnetic stripe reader) or an online setting (e.g., by reading the code from a display and entering the code into a text box on a checkout page of an online purchase transaction). A remote server, such as a payment authorization server, may receive the code and may process a payment differently based on the code received. For example, a code may be a security code to authorize a purchase transaction. A code may provide a payment feature such that a purchase may be made with points, debit, credit, installment payments, or deferred payments via a single payment account number (e.g., a credit card number) to identify a user and a payment feature code to select the type of payment a user desires to utilize.

A dynamic magnetic stripe communications device may include a magnetic emulator that comprises an inductor (e.g., a coil). Current may be provided through this coil to create an electromagnetic field operable to communicate with the read-head of a magnetic stripe reader. The drive circuit may fluctuate the amount of current travelling through the coil such that a track of magnetic stripe data may be communicated to a read-head of a magnetic stripe reader. A switch (e.g., a transistor) may be provided to enable or disable the flow of current according to, for example, a frequency/double-frequency (F2F) encoding algorithm. In doing so, bits of data may be communicated.

Electronics may be embedded between two layers of a polymer (e.g., a PVC or non-PVC polymer). One or more liquid polymers may be provided between these two layers. The liquid polymer(s) may, for example, be hardened via a reaction between the polymers (or other material), temperature, or via light (e.g., an ultraviolet or blue spectrum light) such that the electronics become embedded between the two layers of the polymer and a card is formed.

Layers of colored liquid polymer may be placed on the obverse and reverse surfaces of the card and hardened via a variety of methods. For example, the polymer may be hardened via a reaction with a material (e.g., chemical), temperature, or via light (e.g., an ultraviolet or blue spectrum light). Various layers of colored polymer may be provided in order to form indicia on the obverse and reverse side of the card. Such a printing technique may be utilized, for example, on a mobile telephonic device used for payments.

Layers of colored polymer may be built up, for example, in order to form indicia that extends outwardly from the card. Similarly, layers may be built up to form indicia that is formed via troughs in the layers of colored polymer. Both troughs and extensions may be provided to form indicia. Such indicia may take the form of, for example, a payment card number (e.g., debit account number, pre-paid account number, rewards account number, credit account number, or gift account number). Such indicia may take the form of a user's name, one or more security codes, expiration date, bank issuer logo, technology provider logo, network association logo, security indicia, or any other type of indicia.

The layer of solid polymer above and/or below the embedded electronics (e.g., a layer of PVC or non-PVC) may be for example, approximately 3 thousandths to 6 thousandths of an inch thick (e.g., approximately 5 thousandths of an inch thick). The layers of colored liquid polymer sprayed onto the surface of such layers of solid polymer may be, for example, approximately one tenth of a thousandth of an inch to one half of a thousandth of an inch (e.g., approximately 0.15 of a thousandth of an inch). Different layers of colored liquid polymer may be different thicknesses. For example, one layer may be between, for example, one quarter of a thousandth of an inch and one half of a thousandth of an inch (e.g., approximately one quarter of a thousandth of an inch) and another layer may be between one tenth and two tenths of a thousandth of an inch (e.g., approximately two tenths of a thousandth of an inch). The liquid polymer may be hardened, for example, via a reaction (e.g., a reaction with a material, temperature, the atmosphere, or light). The solid layer of polymer above and below the electronics may be, for example, transparent or non-transparent (e.g., a non-transparent white). The colored layers of liquid polymer may be transparent or non-transparent and may include the colors of approximately white, yellow, blue, red, and black. Transparent liquid polymer may also be sprayed onto the surface of the card and hardened. Additional layers of material may be provided anywhere on the card (e.g., between a solid layer of polymer and sprayed layers of liquid polymer that is later hardened).

Accordingly, printing may be selectively applied anywhere on the surface of a card. Accordingly, a solid layer of transparent polymer may be provided and the electronics package may include a display, light source, and/or a light sensor. No printing may be selectively applied about such a display, light source, and/or a light sensor. In this manner, a printed card may be provided that has no printing over areas where maximum transparency is desired (e.g., around components that provide or receive light).

BRIEF DESCRIPTION OF THE DRAWINGS

The principles and advantages of the present invention can be more clearly understood from the following detailed description considered in conjunction with the following drawings, in which the same reference numerals denote the same structural elements throughout, and in which.

DETAILED DESCRIPTION OF THE INVENTION

Figure 1:
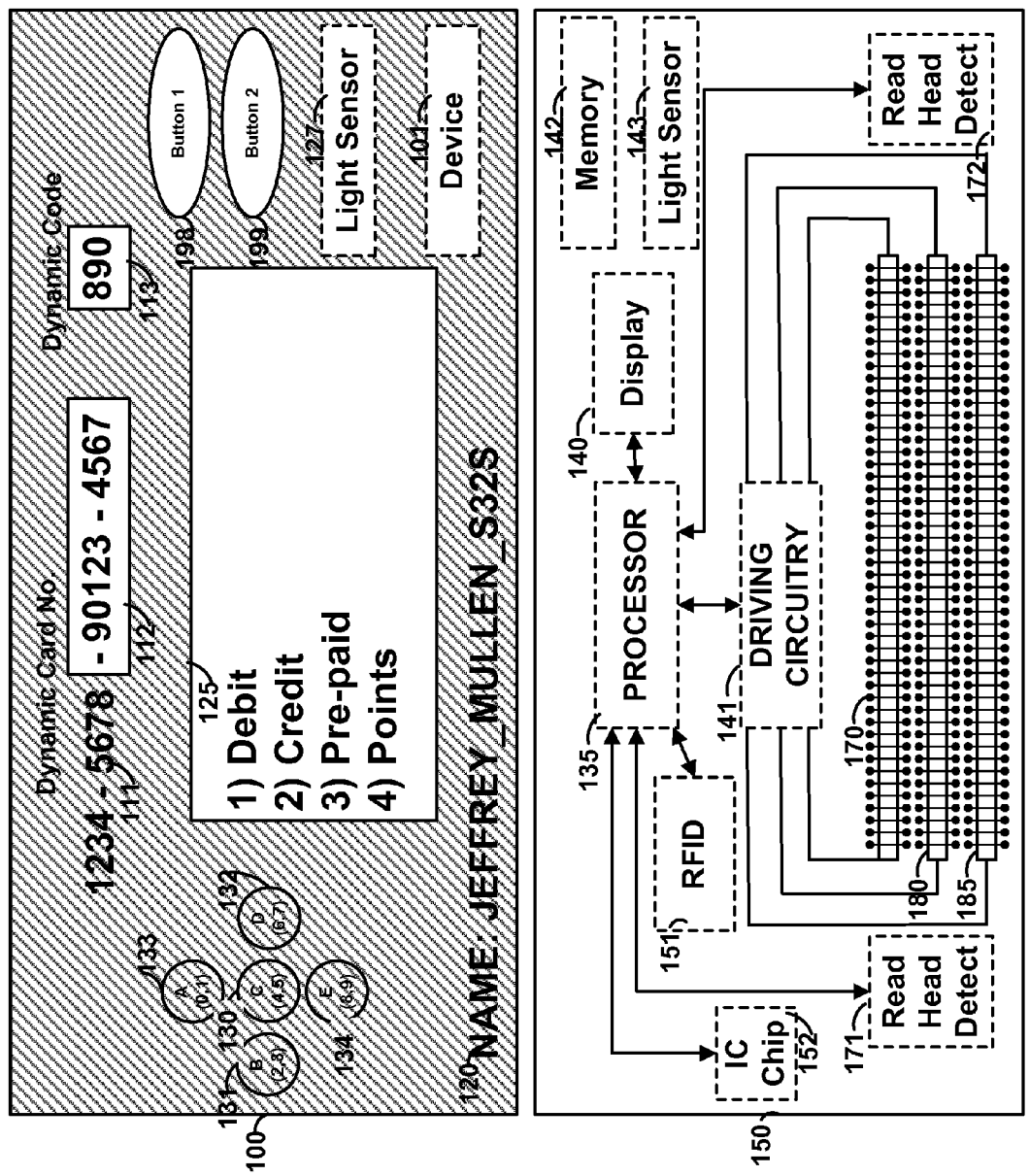
FIG. 1 is an illustration of cards constructed in accordance with the principles of the present invention.

FIG. 1 shows card 100 that may include, for example, a dynamic number that may be entirely, or partially, displayed via display 112. A dynamic number may include a permanent portion such as, for example, permanent portion 111. Permanent portion 111 may be printed as well as embossed or laser etched on card 100. Multiple displays may be provided on a card. For example, display 113 may be utilized to display a dynamic code such as a dynamic security code. Display 125 may also be provided to display logos, barcodes, as well as multiple lines of information. A display may be a bi-stable display or non bi-stable display. Permanent information 120 may also be included and may include information such as information specific to a user (e.g., a user's name or username) or information specific to a card (e.g., a card issue date and/or a card expiration date). Card 100 may include one or more buttons such as buttons 130-134. Such buttons may be mechanical buttons, capacitive buttons, or a combination or mechanical and capacitive buttons. Card 100 may include button 199. Button 199 may be used, for example, to communicate information through dynamic magnetic stripe communications device 101 indicative of a user's desire to communicate a single track of magnetic stripe information. Persons skilled in the art will appreciate that pressing a button (e.g., button 199) may cause information to be communicated through device 101 when an associated read-head detector detects the presence of a read-head of a magnetic stripe reader. Button 198 may be utilized to communicate (e.g., after button 198 is pressed and after a read-head detects a read-head of a reader) information indicative of a user selection (e.g., to communicate two tracks of magnetic stripe data). Multiple buttons may be provided on a card and each button may be associated with different user selections. Light sensor 127 may be provided, for example, to receive information from a display (e.g., a display of a mobile telephonic device or a laptop computer). Display 125 may allow a user to select (e.g., via buttons) options on the display that instruct the card to communicate (e.g., via a dynamic magnetic stripe communications device, RFID, or exposed IC chip) to use a debit account, credit account, pre-paid account, or point account for a payment transaction. Colored liquid polymer may be provided on the surface of the card in layers to form, for example, full-color indicia.

Architecture 150 may be utilized with any card. Architecture 150 may include processor 135. Processor 135 may have on-board memory for storing information (e.g., drive code). Any number of components may communicate to processor 135 and/or receive communications from processor 135. For example, one or more displays (e.g., display 140) may be coupled to processor 135. Persons skilled in the art will appreciate that components may be placed between particular components and processor 135. For example, a display driver circuit may be coupled between display 140 and processor 135. Memory 142 may be coupled to processor 135. Memory 142 may include data that is unique to a particular card. For example, memory 142 may store discretionary data codes associated with buttons of card 150. Such codes may be recognized by remote servers to effect particular actions. For example, a code may be stored on memory 142 that causes a promotion to be implemented by a remote server (e.g., a remote server coupled to a card issuer's website). Memory 142 may store types of promotions that a user may have downloaded to the device and selected on the device for use. Each promotion may be associated with a button. Or, for example, a user may scroll through a list of promotions on a display on the front of the card (e.g., using buttons to scroll through the list). A user may select the type of payment on card 100 via manual input interfaces corresponding to displayed options on display 125. Selected information may be communicated to a magnetic stripe reader via a dynamic magnetic stripe communications device. Selected information may also be communicated to a device (e.g., a mobile telephonic device) having a capacitive sensor or other type of touch sensitive sensor.

Card 100 may include, for example, any number of light sensors 127. Light sensors 127 may be utilized such that a display screen, or other light emitting device, may communicate information to light sensors 127 via light.

Any number of reader communication devices may be included in architecture 150. For example, IC chip 152 may be included to communicate information to an IC chip reader. IC chip 152 may be, for example, an EMV chip. As per another example, RFID 151 may be included to communicate information to an RFID reader. A magnetic stripe communications device may also be included to communicate information to a magnetic stripe reader. Such a magnetic stripe communications device may provide electromagnetic signals to a magnetic stripe reader. Different electromagnetic signals may be communicated to a magnetic stripe reader to provide different tracks of data. For example, electromagnetic field generators 170, 180, and 185 may be included to communicate separate tracks of information to a magnetic stripe reader. Such electromagnetic field generators may include a coil wrapped around one or more materials (e.g., a soft-magnetic material and a non-magnetic material). Each electromagnetic field generator may communicate information serially to a receiver of a magnetic stripe reader for particular magnetic stripe track. Read-head detectors 171 and 172 may be utilized to sense the presence of a magnetic stripe reader (e.g., a read-head housing of a magnetic stripe reader). This sensed information may be communicated to processor 135 to cause processor 135 to communicate information serially from electromagnetic generators 170, 180, and 185 to magnetic stripe track receivers in a read-head housing of a magnetic stripe reader. Accordingly, a magnetic stripe communications device may change the information communicated to a magnetic stripe reader at any time. Processor 135 may, for example, communicate user-specific and card-specific information through RFID 151, IC chip 152, and electromagnetic generators 170, 180, and 185 to card readers coupled to remote information processing servers (e.g., purchase authorization servers). Driving circuitry 141 may be utilized by processor 135, for example, to control electromagnetic generators 170, 180, and 185.

Architecture 150 may also include, for example, light sensor 143. Architecture 150 may receive information from light sensor 143. Processor 135 may determine information received by light sensor 143.

Figure 2:
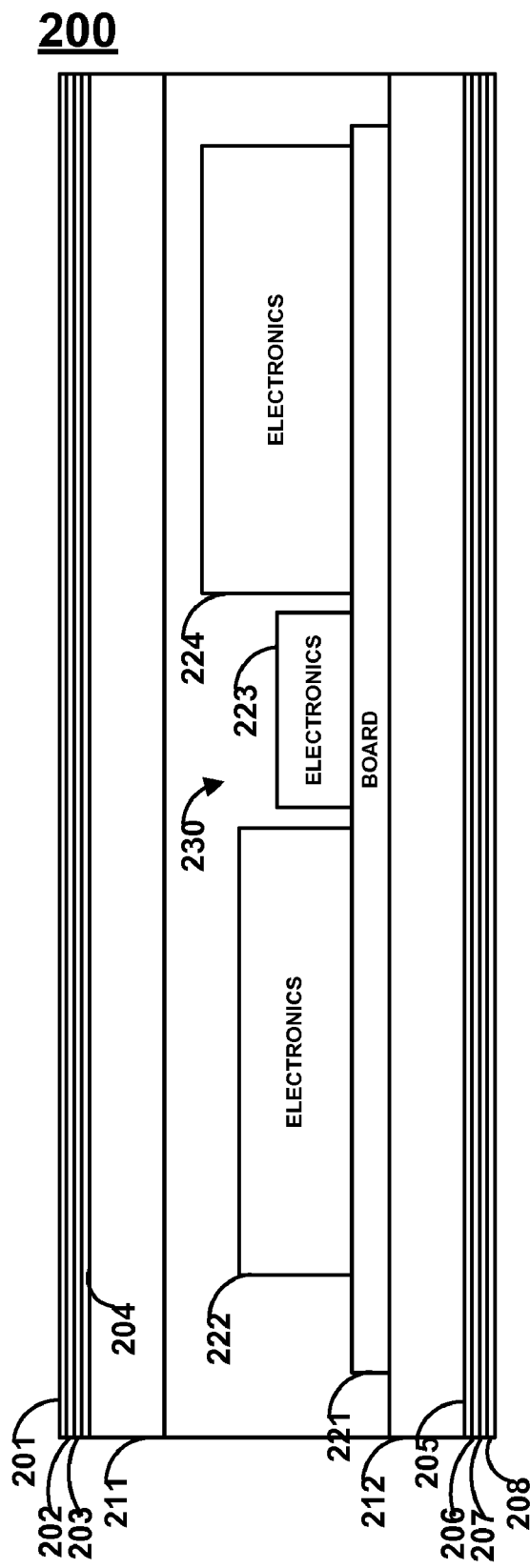
FIG. 2 is an illustration of a card constructed in accordance with the principles of the present invention.

FIG. 2 shows card 200 that may include solid layers 211 and 212, laminate 230 (e.g., laminate that was provided as liquid form and then hardened via a reaction), electronics packages 222, 223, and 224. Electronic packages may be provided on a flexible, multiple layer (e.g., several layer) circuit board 221. Printed polymer layers 201-203 and 206-208 may be provided (e.g., sprayed) onto the surface of layers 211 and 212, respectively in a liquid form. The liquid may be hardened via a reaction (e.g., via light, a gas in the atmosphere, another material, or temperature). Each one of printed layers 201-203 and 206-208 may include one, multiple, or several colors. Such colors may include, for example, white, black, red, blue, magenta, and/or yellow. The layers may be applied at different thicknesses. Accordingly, full-color indicia (e.g., images) may be provided to increase, for example, the whimsical and festive nature of the card as well as increase the structural integrity of the card by providing additional layers of protection to layers 211 and 212. Persons skilled in the art will appreciate that card 200 may be less than, for example, approximately 35 thousandths of an inch (e.g., less than approximately 33 thousandths of an inch). For example, the card may be approximately between 30 and 34 thousandths of an inch.

Figure 3:
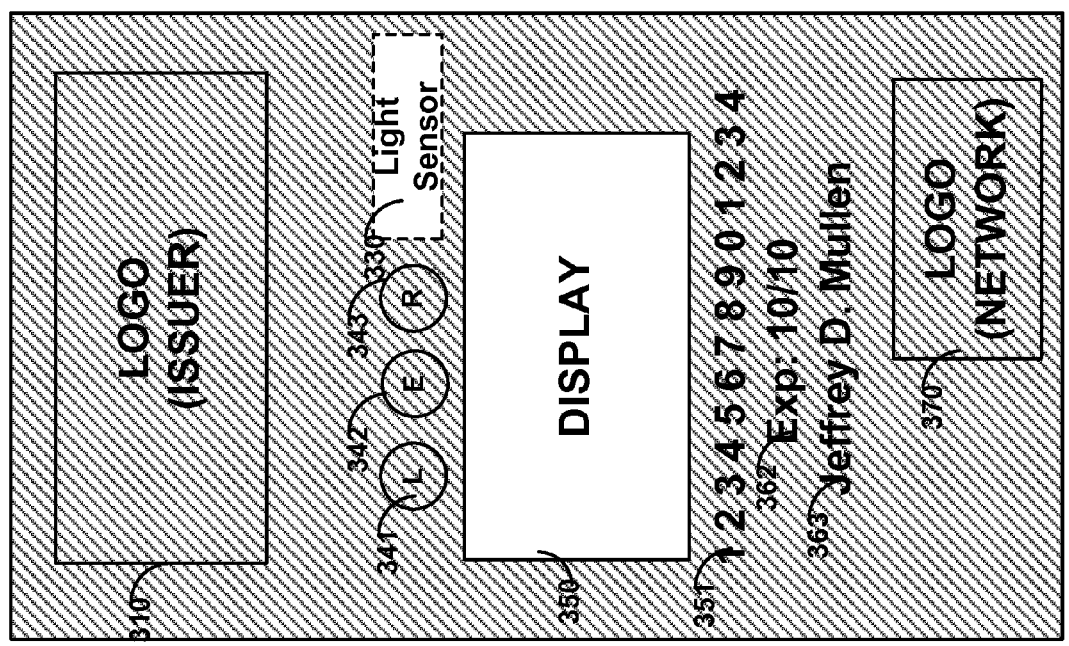
FIG. 3 is an illustration of a card constructed in accordance with the principles of the present invention.

FIG. 3 shows card 300. Card 300 may include, for example, buttons 341-343, and light sensor 330. Card 300 may include printing selectively applied via one, multiple, or several layers to the surfaces of card 300. For example, printing may be provided across the obverse surface of the card except over display 350 and light sensor 330. The printing may provide issuer logo 310 and network association logo 370 as well as payment card number 351, expiration date 362, and name 363. Information 351, 362, and 363 may be provided, for example, as troughs in the printing or as extensions of the printing. Accordingly, information 351, 362, and 363 may have a three-dimensional perspective. Alternatively, for example, information 351, 362, and 363 may be printed to be flush with the rest of the printing such that no three dimensional perspective is provided.

Figure 4:
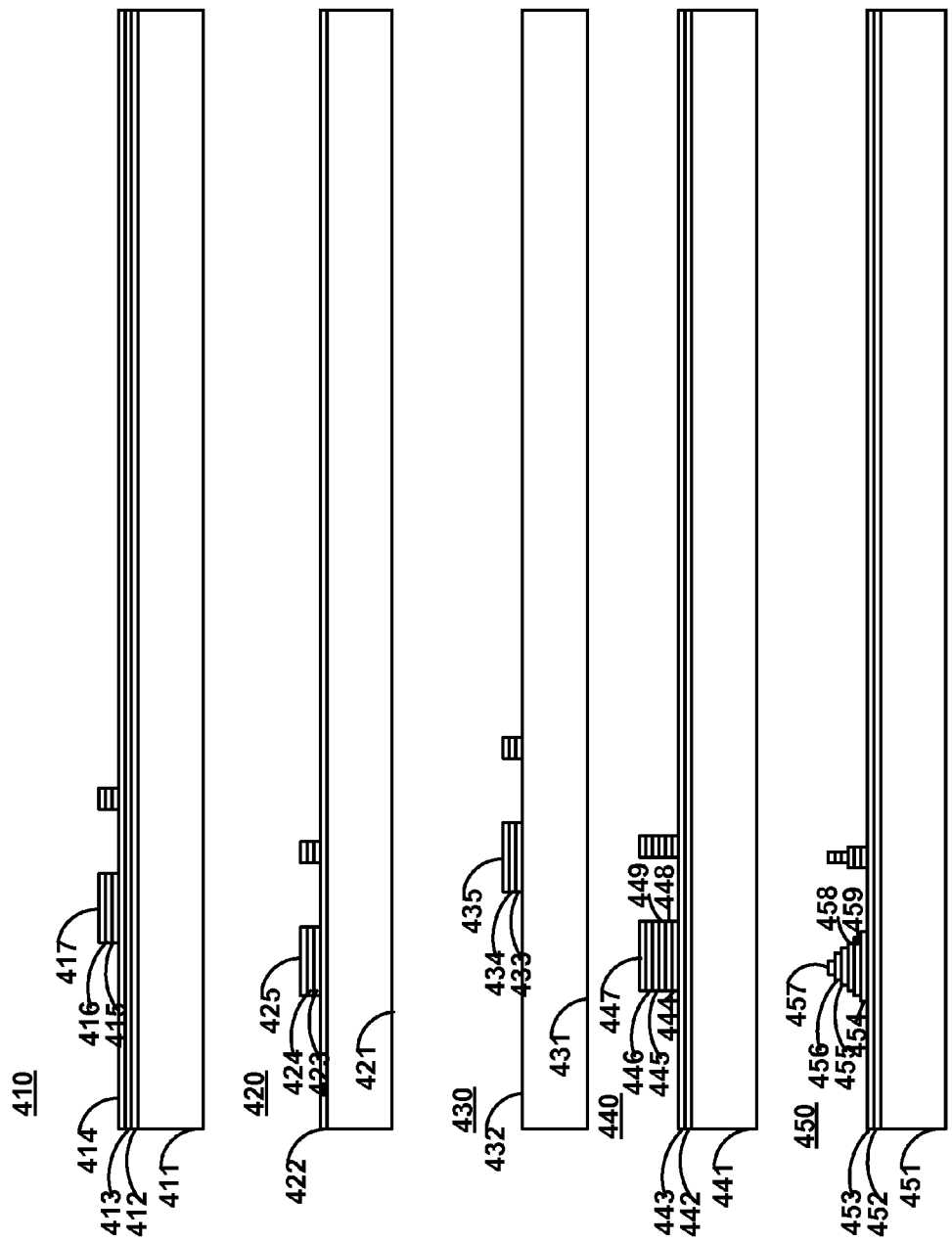
FIG. 4 are illustrations of cards constructed in accordance with the principles of the present invention.

FIG. 4 shows card portions 410, 420, 430, 440, and 450. Card portion 410 includes polymer layer 411 and printed layers 412, 413, 414, 415, 416, and 417. Persons skilled in the art will appreciate that printed layers 415, 416, and 417 extend and may be provided to provide text (e.g., name, account number, expiration date, and/or security code) or three dimensional portions of an image. Card portion 420 may include printed layers 422-425 on top of polymer layer 421. Persons skilled in the art will appreciate that additional layers of material may be provided between polymer layer 421 and printed layer 422. Card portion 430 may be provided with printed layers 433, 434, and 435. Person skilled in the art will appreciate that layers 433-435 may provide extended lettering/images on a thinner card than if, for example, one or more printed layers are printed between layer 431 and layer 433. Providing a layer between layer 431 and layer 433, however, may provide a stronger bond of layer 433 to the card. Persons skilled in the art will appreciate that a printed layer may be provided as a colored liquid plastic that hardens after a reaction (e.g., a reaction to a low-wavelength blue or ultraviolet light). Card portion 440 may include layer 441 and printed layers 442-449. Card portion 450 may include layer 451 and layers 452-459. Person skilled in the art will appreciate that layering vertically and decreasing the area of layers as height increases may provide, for example, a card that is more rounded and durable for certain types of impacts.

Figure 5:
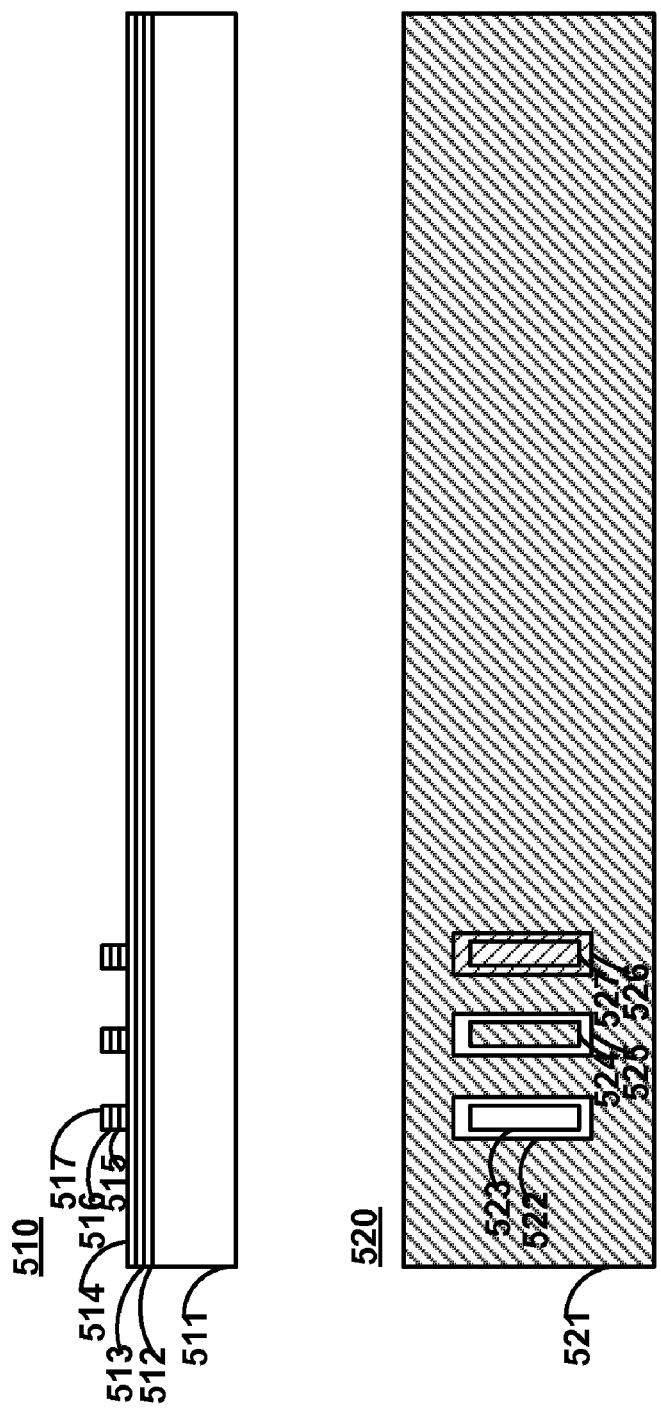
FIG. 5 are illustrations of cards constructed in accordance with the principles of the present invention.

FIG. 5 shows card portions 510 and 520. Card portion 510 may include layer 511 and printed layers 512-517. Persons skilled in the art will appreciate that the portion of layer 513 (as well as layers 513 and 512) located under and within the proximity of extended portions (e.g., extended layers 515, 516, and 517) may be provided to have a different color than layers 515, 516, and 517. Accordingly, if layers 515-517 chip off, for example, the indicia represented by layers 515-517 may still be determined. Similarly, the area under as well as about layers 515-517 may be of the same color as layers 515-517, but different from, for example, the surrounding portions of layers 512-514. Card portion 520 may be, for example, a bird's eye view of the obverse side of a card. Printing 521 may be of a first color while printing 522 and 523 may be of a different color. Printing 533 may be representative of, for example, one, multiple, or several layers and may be any color (e.g., white or black). Printing 522 and 521 may be of the same layer. Printing 524 may be the same color (or a different color) as printing 521, but printing 524 may be a different color. Accordingly, for example, if layers 525 are extensions and are chipped off, for example, any indicia (e.g., alphanumeric character) of printing 524 may still be read via printing 525. Printing 521, 527, and 528 may each be different colors.

Figure 6:
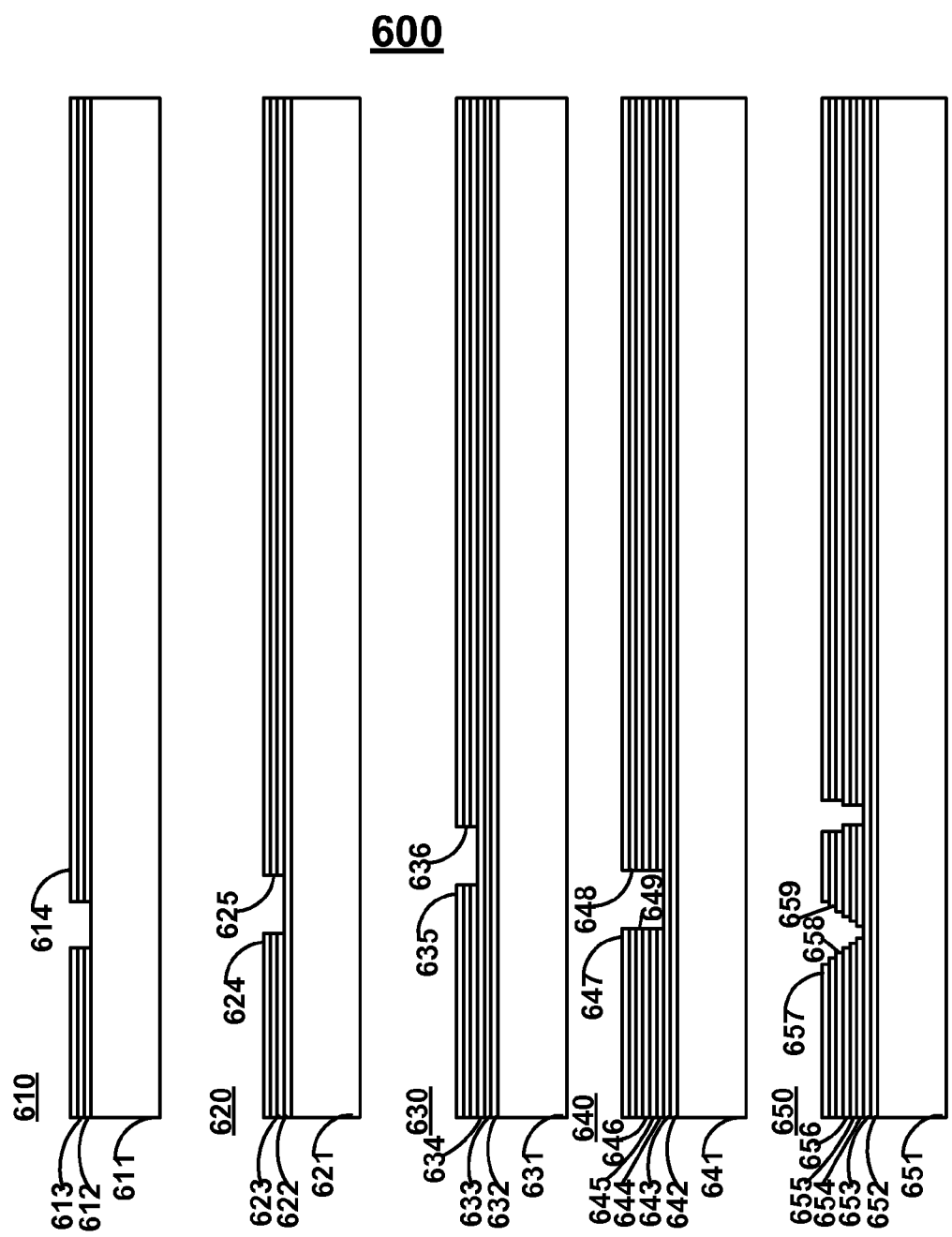
FIG. 6 are illustrations of cards constructed in accordance with the principles of the present invention.

FIG. 6 shows card portions 610, 620, 630, 640, and 650. Portion 610 may include, for example, layer 611 and printed layers 612-614. Indicia may be provided, for example, via troughs formed via layers 612-614. Portion 620 may include layer 621 and printed layers 622-624. Portion 630 may include layer 631 and printed layers 632-636. Portion 640 may include layer 641 and printed layers 642-649. Portion 650 may include layer 651 and printed layers 652-659.

Figure 7:
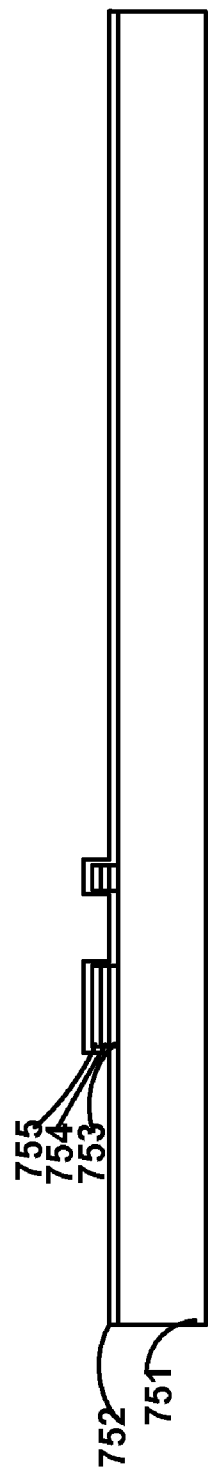
FIG. 7 is an illustration of a card constructed in accordance with the principles of the present invention.

FIG. 7 shows card 700 that may include layer 751, printed layer 752-755. Persons skilled in the art will appreciate that one, multiple, or several layers may be printed over the entire surface of a card after troughs and/or extensions are formed, for example, to form indicia such as payment account numbers, names, expiration dates, loyalty numbers (e.g., frequent flier numbers), status, and other indicia such as images. Such a layer may provide additional structural integrity to a trough or an extension. Extensions may be operable to be imprinted on carbon paper via a payment card imprinter that uses carbon paper to copy information that extends from the surface of a card.

Figure 8:
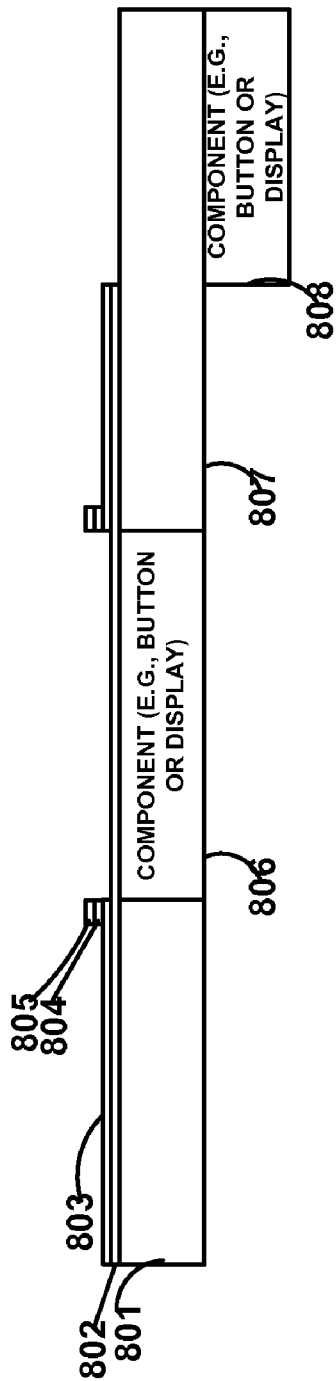
FIG. 8 is an illustration of a card constructed in accordance with the principles of the present invention.

FIG. 8 shows card 800 that includes layer 801, layer 807, electronic component(s) 806, electronic component(s) 808, and printed layers 802-805. No printing may be provided above electronic component(s) 806 and layer 807 may be transparent such that, for example, a user may view electrical component(s) 808. Printing may be provided over a component (or a layer over a component). Extensions may be provided around the perimeter of any component in order to, for example, protect the area above the component from scratching or provide a tactile perimeter for users in low visibility conditions. For example, an extended perimeter may be provided around a button so a user may feel the button in low visibility conditions. An extended perimeter may be provided about a display such that if a user places a card on the top of a table the extensions do not allow the surface of the area above a display to touch the surface of the table. Extensions may be formed, for example, by one or more printed areas around a component. For example, a printed layer may be provided on the entire surface of a card (e.g., a white printed layer) and another printed layer (e.g., a layer of a different color) may be provided around a component (e.g., a button) to provide a perimeter around that component. The additional layer may also be a layer printed across the entire surface of a card except over a component (e.g., a button). More than one button may be provided with a perimeter. For example, two, five, or more than five buttons may be provided with a perimeter.

Figure 9:
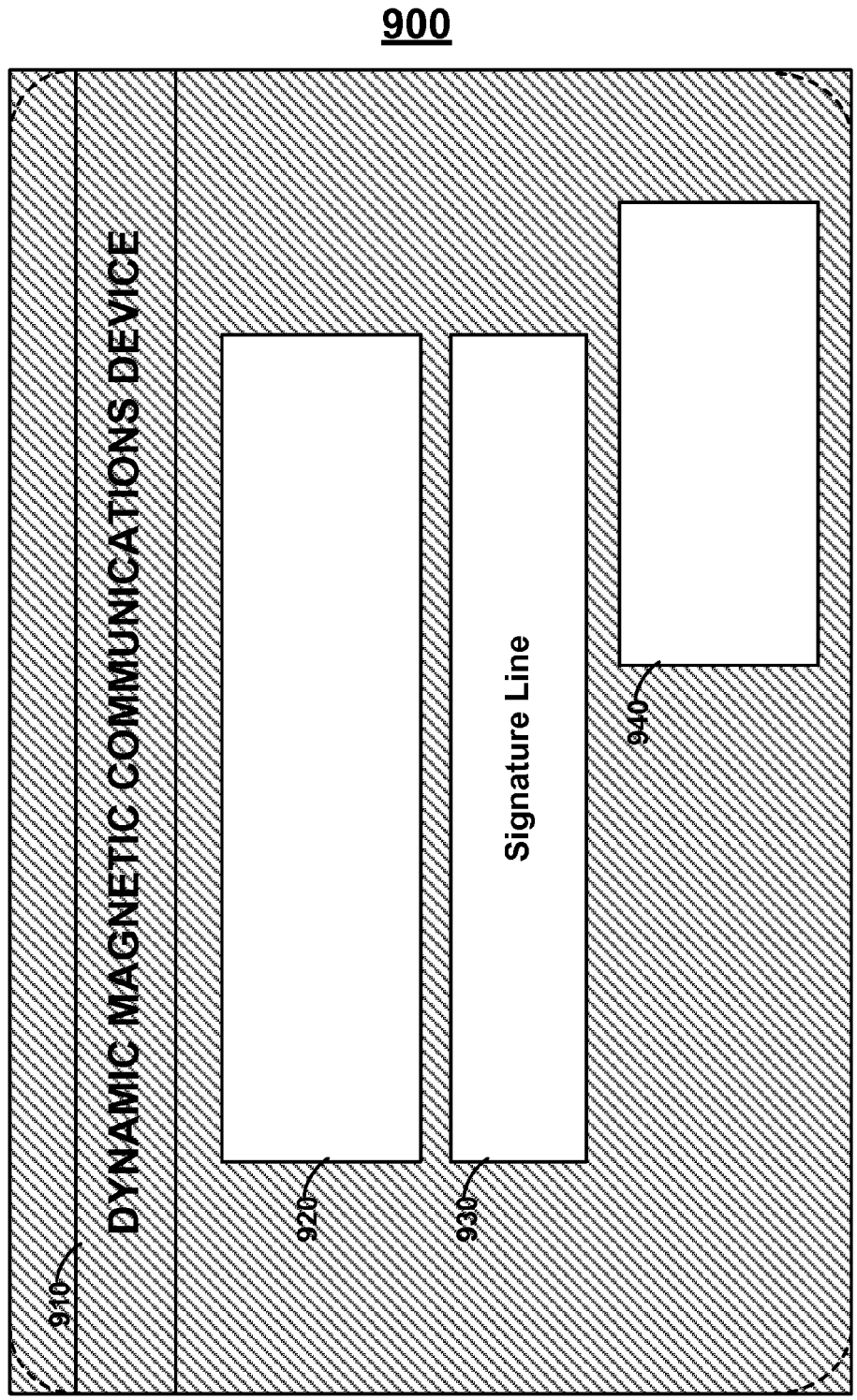
FIG. 9 is an illustration of a card constructed in accordance with the principles of the present invention.

FIG. 9 shows card 900. The surface may include, for example, printing without printing about one or more of areas 920, 930, and 940. Areas 920 and 940 may correspond to a display and/or hologram. Area 930 may correspond to, for example, a signature panel.

Persons skilled in the art will also appreciate that the present invention is not limited to only the embodiments described. Instead, the present invention more generally involves dynamic information and printing. Persons skilled in the art will also appreciate that the apparatus of the present invention may be implemented in other ways then those described herein. All such modifications are within the scope of the present invention, which is limited only by the claims that follow.

What is claimed is:

1. A card comprising:
   a first polymer layer having a thickness of approximately 3 to 6 thousandths of an inch;
   a second polymer layer having a thickness of approximately 3 to 6 thousandths of an inch;
   an electronics package provided between said first layer and said second layer; and
   more than one additional polymer layers provided on said first polymer layer that provide raised indicia operable of being carbon imprinted by a carbon card imprinter.

2. The card of claim 1, wherein at least one of the more than one additional polymer layers is transparent.

3. The card of claim 1, wherein a color of at least one of the more than one additional polymer layers is one of white, black red, blue, magenta and yellow.

4. The card of claim 1, wherein at least one of the more than one additional polymer layers includes at least one of a plurality of colored portions, and a colored portion and a transparent portion.

5. The card of claim 1, wherein at least two of the more than one additional polymer layers are different colors.

6. The card of claim 1, wherein thicknesses of at least two of the more than one additional polymer layers are different.

7. The card of claim 1, wherein the more than one additional polymer layers form an image, and the image is based on at least one of colors and thicknesses of the more than one additional polymer layers.

8. The card of claim 1, wherein a width of at least two of the more than one additional polymer layers is a same width.

9. The card of claim 1, further comprising: a covering layer, wherein the covering layer is wider than at least one of the more than one additional polymer layers, the covering layer being farther from the electronic package than the at least one of the more than one additional polymer layers.

10. A card comprising:
    a first polymer layer having a thickness of approximately 3 to 6 thousandths of an inch;
    a second polymer layer having a thickness of approximately 3 to 6 thousandths of an inch;
    an electronics package provided between said first layer and said second layer; and
    more than one additional polymer layers provided on said first polymer layer that provide recessed indicia, wherein said recessed indicia includes a payment card number.

11. The card of claim 10, wherein at least one of the more than one additional polymer layers is transparent.

12. The card of claim 10, wherein a color of at least one of the more than one additional polymer layers is one of white, black red, blue, magenta and yellow.

13. The card of claim 10, wherein a color of at least one of the more than one additional polymer layers is at least two of white, black red, blue, magenta and yellow.

14. The card of claim 10, wherein at least two of the more than one additional polymer layers are different colors.

15. The card of claim 10, wherein thicknesses of at least two of the more than one additional polymer layers are different.

16. The card of claim 10, wherein the more than one additional polymer layers form an image, and the image is based on at least one of colors and thicknesses of the more than one additional polymer layers.

17. The card of claim 10, wherein a width of at least two of the more than one additional polymer layers is a same width.

18. The card of claim 10, further comprising: a covering layer, wherein the covering layer is wider than at least one of the more than one additional polymer layers, the covering layer being farther from the electronic package than the at least one of the more than one additional polymer layers.

\* \* \* \* \*